US008675247B2

(12) United States Patent
Ito et al.

(10) Patent No.: US 8,675,247 B2
(45) Date of Patent: Mar. 18, 2014

(54) IMAGE FILE CREATION DEVICE, METHOD AND PROGRAM STORAGE MEDIUM, IMAGE PROCESSING DEVICE, METHOD AND PROGRAM STORAGE MEDIUM, AND IMAGE PROCESSING SYSTEM

(75) Inventors: Akhiro Ito, Kanagawa (JP); Ryosuke Higashikata, Kanagawa (JP); Yasunari Kishimoto, Kanagawa (JP); Yasuki Yamauchi, Kanagawa (JP); Noriko Hasegawa, Kanagawa (JP); Hidetoshi Kawashima, Kanagawa (JP); Kiyoshi Une, Saitama (JP); Toshihiro Iwafuchi, Kanagawa (JP); Jungo Harigai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1257 days.

(21) Appl. No.: 12/103,297

(22) Filed: Apr. 15, 2008

(65) Prior Publication Data
US 2008/0259371 A1 Oct. 23, 2008

(30) Foreign Application Priority Data

Apr. 20, 2007 (JP) ................. 2007-112010

(51) Int. Cl.
*G06F 15/00* (2006.01)
*G06K 1/00* (2006.01)
(52) U.S. Cl.
USPC ............................ 358/1.9; 382/166; 382/167
(58) Field of Classification Search
USPC ................. 358/1.9; 382/166, 167; 348/222.1
See application file for complete search history.

(56) References Cited

U.S. PATENT DOCUMENTS

| 6,633,668 | B1* | 10/2003 | Newman ................. 382/166 |
| 8,013,903 | B2* | 9/2011 | Ohga ................. 348/222.1 |
| 2003/0016865 | A1* | 1/2003 | Lopez et al. ............ 382/165 |
| 2003/0122806 | A1* | 7/2003 | Edge ..................... 345/204 |
| 2005/0168596 | A1 | 8/2005 | Ito et al. |
| 2006/0274342 | A1* | 12/2006 | Haikin et al. ............ 358/1.9 |
| 2007/0058186 | A1* | 3/2007 | Tanaka ................. 358/1.9 |
| 2007/0195345 | A1* | 8/2007 | Martinez et al. ......... 358/1.9 |
| 2009/0010535 | A1* | 1/2009 | Koishi ................. 382/167 |

FOREIGN PATENT DOCUMENTS

| JP | A-09-080849 | 3/1997 |
| JP | A-11-146214 | 5/1999 |
| JP | A-2002-281338 | 9/2002 |

(Continued)

OTHER PUBLICATIONS

Sasaki et al., "The Continuous Color Prediction Model based on Weighted Linear Regression," *Proc. of International Congress of Imaging Science 2002*, pp. 413-414, 2002.

(Continued)

*Primary Examiner* — Mark K Zimmerman
*Assistant Examiner* — Michael Burleson
(74) *Attorney, Agent, or Firm* — Oliff PLC

(57) ABSTRACT

There is provided an image file creation device including: an obtaining section that obtains image data forming a color image, conversion conditions for converting the image data into color data of a device-independent color space, and basic viewing conditions for viewing the color image; an input section that inputs target viewing conditions for viewing a formed image that is formed by using the image data; and a creation section that creates an image file containing a main data region for storing the image data, the conversion conditions and the basic viewing conditions, and a sub-data region for storing the target viewing conditions.

17 Claims, 8 Drawing Sheets

(56) References Cited

FOREIGN PATENT DOCUMENTS

| | | |
|---|---|---|
| JP | A-2002-320098 | 10/2002 |
| JP | A-2003-018420 | 1/2003 |
| JP | A-2005-210370 | 8/2005 |
| WO | WO 2007/007798 A1 | 1/2007 |

OTHER PUBLICATIONS

CIE TRI59: 2004, "A Colour Appearance Model for Colour Management Systems: CIECAM02," pp. 1-16, 2004.

Japanese Office Action issued in Japanese Application No. 2007-112010 dated Aug. 23, 2011 (w/ English Translation).

\* cited by examiner

IMAGE FILE CREATION DEVICE, METHOD AND PROGRAM STORAGE MEDIUM, IMAGE PROCESSING DEVICE, METHOD AND PROGRAM STORAGE MEDIUM, AND IMAGE PROCESSING SYSTEM

CROSS-REFERENCE TO RELATED APPLICATION

This application claims priority under 35 USC 119 from Japanese Patent Application No. 2007-112010 filed Apr. 20, 2007.

BACKGROUND

1. Technical Field

The present invention relates to an image file creation device, method and program storage medium, an image processing device, method and program storage medium, and an image processing system that handle image files by taking color appearance into consideration.

2. Related Art

When acquiring multicolor image data or an image itself by an input device, or displaying or print-outputting by an output device, the color reproduction regions are determined in accordance with the characteristics of tile respective devices. For example, in a case of outputting an image from an image forming device, when a color that cannot be reproduced at the image forming device is included in the image for which outputting is instructed, conversion processing (color region compression processing or color correction processing) for keeping the color within the reproducible color range will be carried out. At a device such as an image forming device, an image is formed by using color materials, and the colors of the image are expressed in a device color space whose essential elements are the colors of these color materials. The CMYK color space and the like are known as examples of device color spaces. Further, in conversion processing relating to color, it is preferable to carry out processing in a color space that does not depend on characteristics of individual devices (a device-independent color space). The CIELAB color space, the CIEXYZ color space and the like are known as examples of device-independent color spaces.

A color management system (CMS) is known in order to manage colors between devices that differ in this way. The CMS can manage calorimetric colors even between different devices, by exchanging color information between the devices via a color space that does not depend on a device, such as the CIEXYZ color space or the CIELAB color space.

A color image is dependent on the surrounding environment in which that color image is viewed. Therefore, there are cases in which color appearance differs in accordance with the viewing environment. Thus, in order to address the variations in color appearance due to the viewing environment, there have been proposed systems in which the concept of a color appearance model (CAM) is introduced into the CMS, and differences in appearance due to viewing environments are taken into consideration. Data of the viewing environment is needed in such a system.

However, providing sensors in order to take the appearance of a color image into consideration is expensive. Further, periodic calibration is required in order to maintain the accuracy of the sensors, and management will be complex. Note that, because the appearance of a color image depends on the viewing environment, there are cases in which the measured values fluctuate greatly. Namely, even in the same environment, there are cases in which the measured values differ greatly due to the effects of external light, the colors and arrangement of peripheral objects, the positional relationship between the measuring and illuminating devices, and the like.

Further, it has been thought to take the appearance of a color image into consideration by preparing in advance correction values that correspond to the conditions of a viewing environment and to set these to reproduction devices, without using sensors. However, in such a case, extensive knowledge regarding the appearances of color images, such as that of an experienced person or the like is required, and there is a strong possibility that inappropriate settings may be carried out.

Moreover, in the printing industry field, there are cases in which color management which carries out colorimetric matching for plural color images is demanded. In a CMS in which a CAM is introduced such as described above, colorimetric matching cannot be realized if the viewing conditions are not set appropriately.

SUMMARY

An aspect of the present invention is an image file creation device including: an obtaining section that obtains image data forming a color image, conversion conditions for converting the image data into color data of a device-independent color space, and basic viewing conditions for viewing the color image; an input section that inputs target viewing conditions for viewing a formed image that is formed by using the image data; and a creation section that creates an image file containing a main data region for storing the image data, the conversion conditions and the basic viewing conditions, and a sub-data region for storing the target viewing conditions.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail hereinafter with reference to the drawings.

[Conceptual Process of Color Management]

The concepts of the handling of data including color images and image files, which is a prerequisite to explanation of an example of the exemplary embodiment, will be described first.

Figure 4:
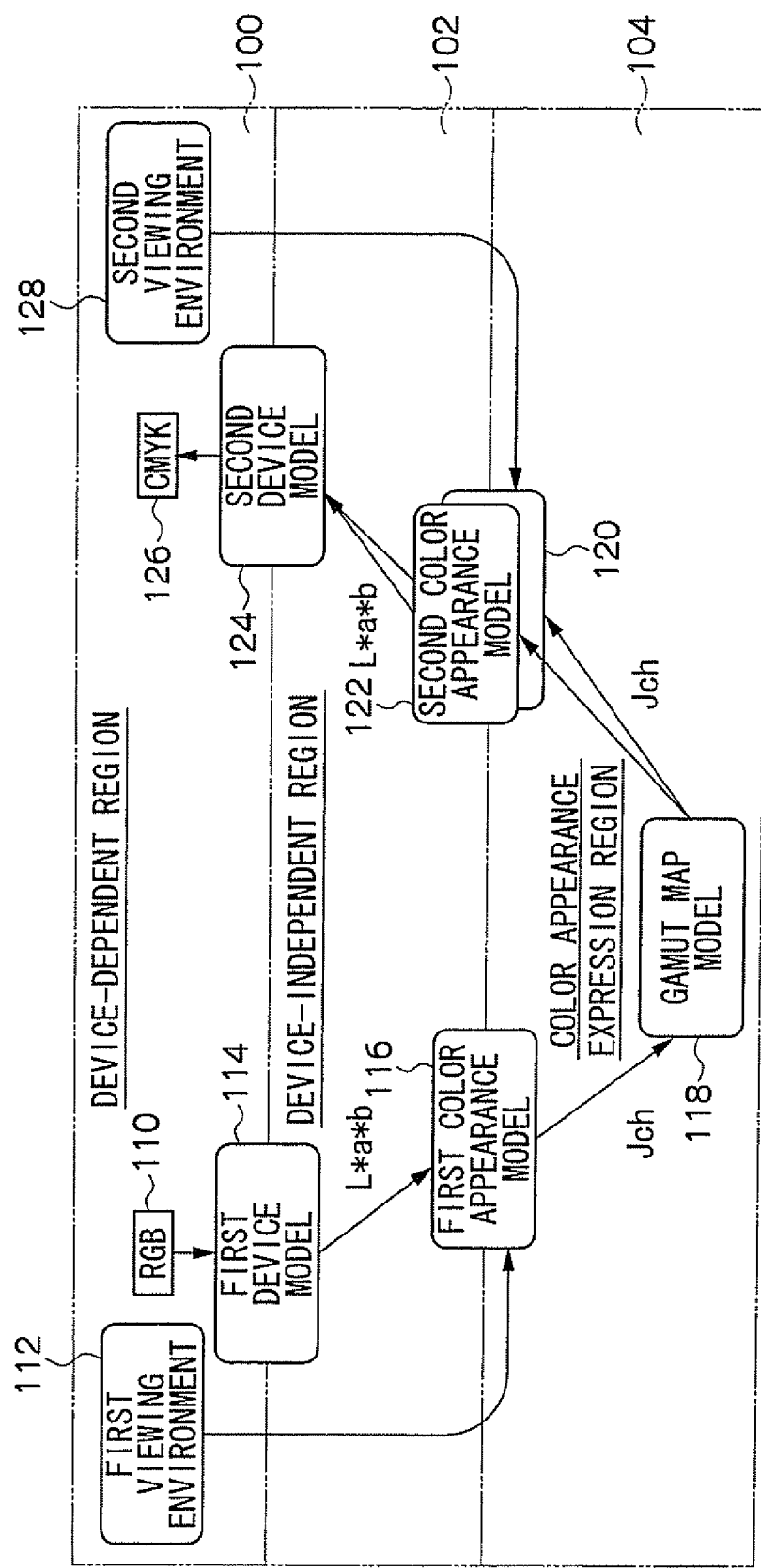
FIG. 4 is a conceptual process diagram in which color appearance is taken into consideration in processes up through formation of a color image which is viewed in a viewing environment different than that of the color image at the time of creation.

FIG. 4 shows the conceptual process by which color appearance is matched in the processes up through the formation of a color image which is viewed in a second viewing environment from a color image which is viewed in a first viewing environment.

The color appearance of a color image varies in accordance with the environment in which the color image is viewed. Namely, the viewing environment differs in accordance with the effects of external light, the colors and placement of peripheral objects, the colors and the positional relationship of the illuminating device, and the like. When the environments in which a color image is viewed differ, the appearance of the colors (the way that the colors are felt or perceived) differs. Therefore, even if there is the same color stimulus (the same color image), the colors will be seen as different colors if the environments in which they are viewed differ. Thus, in consideration of handling colors from the standpoint of color management, it is assumed that colors are handled by being divided into three regions which are a device-dependent region 100, a device-independent region 102, and a color appearance expression region 104.

In order to form a color image of a color coordinate system that is in accordance with the color values of a device (e.g., RGB or CMY) as a color image of a different color coordinate system, the conventional CMS carries out color conversion via a color space that does not depend on devices such as the CIEXYZ color space or the CIELAB color space, and thereby enables color reproduction between different devices. Namely, as shown in FIG. 4, color data of a device-independent color space is obtained by using, as a first device model 114, a system that converts image data 110 of a color coordinate system (RGB color system) into image data of a device-independent color space (L*a*b* space). On the other hand, image data 126 of another color coordinate system (the CMYK color system) can be obtained from color data of a device-independent color space by using, as a second device model 124, a system that converts from the image data 126 of the CMYK color system into image data of a device-independent color space (L*a*b* space) and executing reverse conversion thereof.

In this way, a conventional CMS can accomplish its objective if handling colors only between the device-dependent region 100 and the device-independent region 102.

The concept of color appearance must be introduced in order to take the viewing environment into consideration for a color image. Thus, in addition to the device-dependent region 100 and the device-independent region 102, it can be thought to expand to the concept of the color appearance expression region 104.

The calorimetric colors can be reproducibly maintained by color data in the device-independent region 102. Accordingly, if data relating to a viewing environment is added to a color image, the viewing environment of the color image can be taken into consideration. Thus, when the viewing environment at the time of creating the image data 110 in the device-dependent region 100 is a first viewing environment 112, a system that reflects the data of the first viewing environment 112 in color data of a device-independent color space (L*a*b* space) and converts into an image file (JCh) that includes the viewing environment, is defined as a first color appearance model 116. In this way, an image file that includes the viewing environment can be obtained. Further, a model 118 that corrects differences between the color regions of the first device model 114 and the second device model 124 is defined. On the other hand, a system that reflects another viewing environment (a second viewing environment 128) is defined as a second color appearance model 120. Accordingly, by executing reverse conversion of this system, color data of a device-independent color space can be obtained from the image file.

By handling an image file that includes the viewing environment in this way, color reproduction will be possible such that the color appearances match by taking the viewing environments of a color image into consideration.

Although details thereof will be described hereinafter, the exemplary embodiment further expands on the above-described concept, and can utilize the second color appearance model 120, and further, at the time of creating a color image, can utilize a recommended color appearance model 122 that reflects a recommended viewing environment at the output end of that color image. In this way, a color image adapted with a viewing environment, that is unrelated to the second viewing environment 128 and that is recommended in the intentions of the creating end (i.e., the creator), can be formed, and matching of calorimetric colors can be realized.

(Image File)

An image file that forming a color image handled in the exemplary embodiment will be described next.

Figure 5:
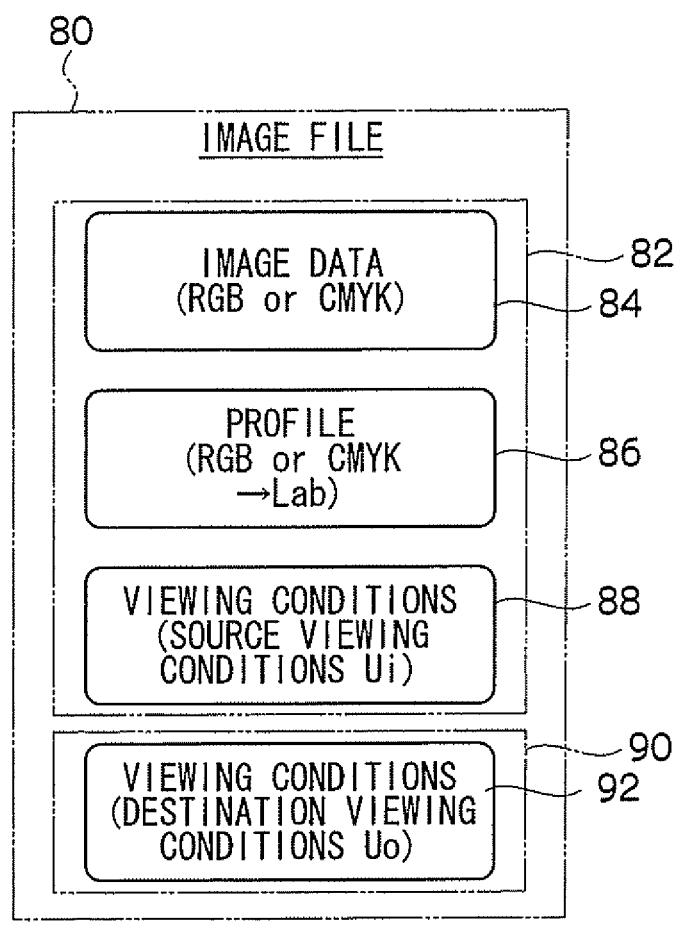
FIG. 5 is a conceptual illustration showing the structure of an image file.

FIG. 5 shows the data structure of the image file that expresses the color image that is handled in the exemplary embodiment. An image file 80 includes a main data region 82 and a sub-data region 90.

Image data 84, a profile 86, and viewing conditions 88 are stored in the main data region 82. The image data 84 is color values in a color coordinate system at the time when the color image is created, and corresponds to the image data 110 of the RGB color system shown in FIG. 4. The profile 86 is conversion coefficients of known formulas for a system that converts image data of a color coordinate system into color data of a device-independent color space. The profile 86 corresponds to coefficients that obtain color data of a device-independent color space as the first device model 114 shown in FIG. 4. The viewing conditions 88 indicate the viewing conditions at the time of creating the color image, and are a digitization of the first viewing environment 112 of FIG. 4.

Viewing conditions 92 are stored in the sub-data region. As will be described in detail later, the viewing conditions 92 are added, for example, at the time of creation of the image file, and are for reflecting the viewing conditions that are recommended as intentions of the creator at the time of creation for the color image formed from the data stored in the main data region 82.

In this way, the exemplary embodiment assumes that the image file 80, which is to be processed, is formed from the main data region 82 and the sub-data region 90. However, the exemplary embodiment can also handle an image file that is formed only from the main data region 82 (details thereof will be described later). In this case, it suffices to determine the viewing conditions by judging whether or not the sub-data region 90 exists or whether or not the contents of the viewing conditions 92 are proper.

(Color Appearance Model)

Next, the first color appearance model 116 or the second color appearance model 120 will be described. The color appearance model expresses the system that is converted in accordance with the following formulas.

First, the viewing conditions are digitized and inputted. The viewing conditions may be input manually by a user via an input device such as a keyboard or the like, or may be input automatically based on detection results of a sensor. The following items are items to be inputted as the viewing conditions.

adaptation field luminance: (cd/m$^2$): $L_A$ relative tristimulus values of white reference: $X_W, Y_W, Z_W$ relative luminance of background portion: $Y_b$
degree of influence of surround: c
color inducing factor: Nc
degree of adaptation to the white point: D
adaptation degree factor: F
background induction factor: n
background brightness induction factor: Nbb
chromatic brightness induction factor: Ncb
base exponential nonlinearity: z Note that the degree of influence of surround c, the color inducing factor Nc and the adaptation degree factor F can be values relating to the surrounding environment.

Further, colors of a color image will be expressed by relative tristimulus values X, Y, Z of a color image sample.

Color adaptation correction is carried out by using the following formulas by using the above items.

Color Adaptation Correction $$\begin{bmatrix} R \\ G \\ B \end{bmatrix} = M_{CAT02} \begin{bmatrix} X \\ Y \\ Z \end{bmatrix}$$

$$M_{CAT02} = \begin{bmatrix} 0.7328 & 0.4296 & -0.1624 \\ -0.7036 & 1.6975 & 0.0061 \\ 0.0030 & 0.0136 & 0.9834 \end{bmatrix}$$

$$M_{CAT02}^{-1} = \begin{bmatrix} 1.096124 & -0.278869 & 0.182745 \\ 0.454369 & 0.473533 & 0.072098 \\ -0.009628 & -0.005698 & 1.015326 \end{bmatrix}$$

$R_C = [(Y_W \cdot D / R_W) + (1-D)]R$ $G_C = [(Y_W \cdot D / G_W) + (1-D)]G$ $B_C = [(Y_W \cdot D / B_W) + (1-D)]B$ $$D = F \cdot \left[1 - \left(\frac{1}{3.6}\right) e^{\left(\frac{-(L_A + 42)}{92}\right)}\right]$$

Next, environment-dependent constants are derived by using the following formulas.

Derivation of Environment-Dependent Constants $k = 1/(5L_A + 1)$ $F_L = 0.2 k^4 (5L_A) + 0.1 (1-k^4)^2 (5L_A)^{1/3}$ $n = Y_b / Y_W$ $N_{bb} = N_{cb} = 0.725 (1/n)^{0.2}$ $z = 1.48 + \sqrt{\sqrt{n}}$ Next, cone response correction is carried out by using the following formulas.

Cone Response Correction $$\begin{bmatrix} R' \\ G' \\ B' \end{bmatrix} = M_{HPE} M_{CAT02}^{-1} \begin{bmatrix} R_C \\ G_C \\ B_C \end{bmatrix}$$

$$M_{HPE} = \begin{bmatrix} 0.38971 & 0.68898 & -0.07868 \\ -0.22981 & 1.18340 & 0.04641 \\ 0.00000 & 0.00000 & 1.00000 \end{bmatrix}$$

$$R'_a = \frac{400(F_L R'/100)^{0.42}}{27.13 + (F_L R'/100)^{0.42}} + 0.1$$

$$G'_a = \frac{400(F_L G'/100)^{0.42}}{27.13 + (F_L G'/100)^{0.42}} + 0.1$$

$$B'_a = \frac{400(F_L B'/100)^{0.42}}{27.13 + (F_L B'/100)^{0.42}} + 0.1$$

By using the results of the above respective calculations, the correlation amounts of color appearance can be determined by using the following formulas.

Color Appearance Correlation Amounts

Given that:
Hue (h)
Brightness (Q), Lightness (J)
Colorfulness (s), Chroma (C), Saturation (M)

$a = R'_a - 12 G'_a / 11 + B'_a / 11$ $b = (1/9)(R'_a + G'_a - 2B'_a)$ $h = \tan^{-1}(b/a)$ and unique hue data is defined as follows:
Red: i=1, $h_i$=20.14, $e_i$=0.8, $H_i$=0
Yellow: i=2, $h_i$=90.00, $e_i$=0.7, $H_i$=100
Green: i=3, $h_i$=164.25, $e_i$=1.0, $H_i$=200
Blue: i=4, $h_i$=237.53, $e_i$=1.2, $H_i$=300
Red: i=5, $h_i$=20.14, $e_i$=0.8, $H_i$=400, $$e_i = \frac{1}{4}\left[\cos\left(h \frac{\pi}{180} + 2\right) + 3.8\right]$$

$$H = H_i + \frac{100(h' - h_i)/e_i}{(h' - h_i)/e_i + (h_{i+1} - h')/e_{i-1}}$$

$A = [2R'_a + G'_a + (1/20)B'_a - 0.305]N_{bb}$ $J = 100(A/A_W)^{cz}$ $Q = (4/c)\sqrt{J/100}\,(A_W + 4)F_L^{0.25}$ $$t = \frac{(5000/13)N_c N_{cb} e_t (a^2 + b^2)^{1/2}}{R'_a + G'_a + (21/20)B'_a}$$

$C = t^{0.9} \sqrt{J/100}\,(1.64 - 0.29^n)^{0.73}$ $M = C F_L^{0.25}$ $s = 100\sqrt{M/Q}$ The formulas of the above computation show the processes of the color appearance models, and the color appearance correlation amounts from the results of computation show the results of conversion of the first color appearance model 116 or the second appreance model 120. Accordingly, it suffices to store at least the above input data as the viewing conditions 88.

The formulas and coefficients for carrying out the above conversion (computation) may be stored in advance, or may be read-in from the exterior. In this case, the above formulas can be stored in advance in the memory of a computer. Further, in the above description, tristimulus values (X, Y, Z) are used as the values expressing the device-independent color space, but the exemplary embodiment is not limited to the same, and another color system of device-independent color space may be used.

[Color Management System]

The exemplary embodiment will be described in detail next based on the above-described concepts and structures.

Figure 1:
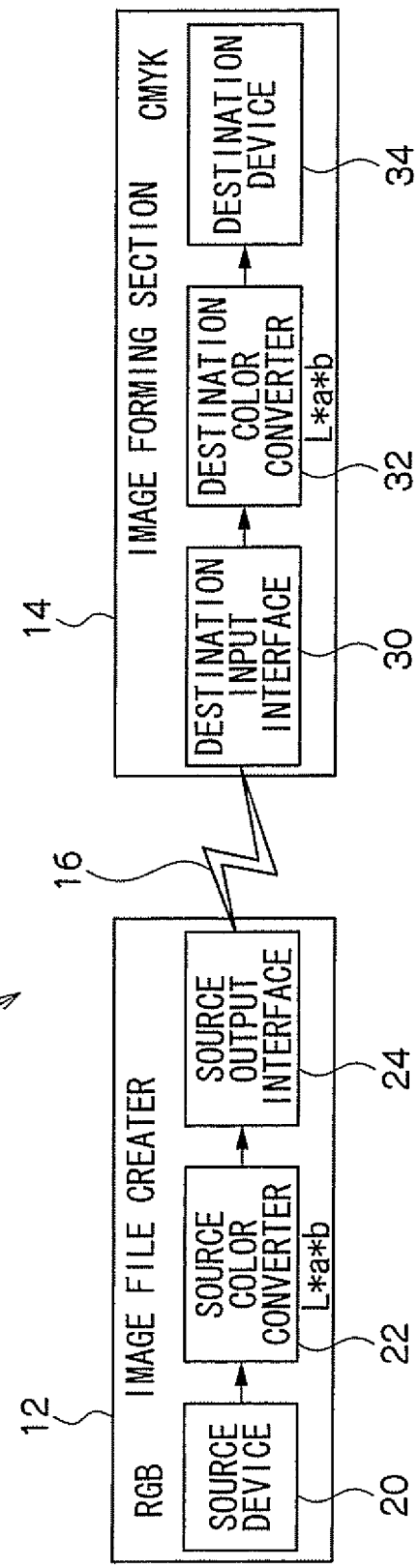
FIG. 1 is a block diagram showing the schematic structure of a color management system to which the exemplary embodiment can be applied.

A color management system 10 to which the exemplary embodiment can be applied is shown in FIG. 1. The color management system 10 includes an image file creation section 12 for creating image files expressing color images, and an image forming section 14 for forming color images by using image files. The image file creation section 12 and the image forming section 14 are connected by a communication line 16 so as to be able to transmit and receive data and commands. Note that, in FIG. 1, a case in which the image file creation section 12 and the image forming section 14 are connected by the communication line 16 is described as the color management system. However, the image file creation section 12 and the image forming section 14 may be structured independently without being connected. In this case, an image file (data) can be stored in a storage medium such as a flexible disk or the like, and the image file can be delivered and received between the image file creation section 12 and the image forming section 14 thereby.

The image file creation section 12 creates, as an image file expressing a color image, an image file (see FIG. 5) in which various types of profiles and various types of conditions are given to the image data that is the basis of the color image. On the other hand, the image forming section 14 carries out color conversion processing (see FIG. 4) by using the image file created at the image file creation section 12.

The image file creation section 12 includes a source (creation end) device 20, a source (creation end) color converter 22, and a source (creation end) output interface 24. Although details thereof will be described later, in the exemplary embodiment, the image file creation section 12 includes the source color converter 22, but it is not essential that the source color converter 22 carry out color conversion processing. Namely, it suffices for the image file creation section 12 to be a functional section that at least gives a profile for color conversion processing so that color conversion processing is possible in a following stage.

In FIG. 1, the main functions of the image file creation section 12 are illustrated as a block diagram, but the image file creation section 12 may be, for example, an computer structure (unillustrated). This computer can be provided with hardware resources such as a CPU, a memory, peripheral devices such as a keyboard and a display, and software resources such as processing programs and data stored in the memory. By executing the processing programs at the computer by using these hardware resources and software resources, the functions of the source device 20, the source color converter 22 and the source output interface 24 can be realized.

The source device 20 is a device for creating color image data for creating a color image, e.g., image data expressing an image which is an object of printing. A scanner that reads-out an original and other computers that output image data (e.g., a device inputting image data of a color image that is expressed by the colors in the RGB color space) are examples of the source device 20. Further, the source device 20 may function as an image data input section that inputs image data from the scanner or other computer.

The source device 20 may also structured from the hardware resources and the software resources of the computer that is used as the image file creation section 12. Namely, the source device 20 may create color image data by causing the computer to execute an application program for image drawing or the like that has been stored in advance in the computer.

The source color converter 22 is a functional section that executes color conversion processing, or that gives, to the color image data, a profile for executing color conversion processing such that color conversion processing is possible in a processing at a following stage. For example, as will be described in detail later (FIG. 2), the source color converter 22 is a functional section that carries out, on the created color image data, color conversion processing for reflecting color appearance, or that gives, to the created color image data, various types of profiles. An image file (FIG. 5) is created at this source color converter 22.

The source output interface 24 is a functional section that converts the image file created at the source color converter 22 into a form that can be outputted to the exterior of the image file creation section 12. For example, the source output interface 24 can provide a function of converting the image file into a signal that is in accordance with a predetermined protocol in order to transmit the image file by the communication line 16, and outputting the signal. Further, when the image file is stored at a storage medium is utilized, the source output interface 24 may be a functional section including a device for writing to a flexible disk and that executes the processing of writing the image file to a flexible disk.

The image forming section 14 is provided with a destination (output end) input interface 30, a destination (output end) color converter 32, and a destination (output end) device 34. The main functions of the image forming section 14 are illustrated as a block diagram in FIG. 1, but the image forming section 14 also may be a computer structure (unillustrated). This computer can be provided with hardware resources such as a CPU, a memory, peripheral devices such as a keyboard and a display, and software resources such as processing programs and data stored in the memory. By executing the processing programs at the computer by using these hardware resources and software resources, the functions of the destination input interface 30, the destination color converter 32, and the destination device 34 can be realized.

The image forming section 14 can be incorporated into an image forming device such as a color copier. A structure which, after forming a color image by an electrophotographic method by using toners of the respective colors of CMYK, transfers and fixes the color image to a sheet, can be used in the image forming device. However, the exemplary embodiment is not limited to the same, and can also utilize a structure that forms an image onto a sheet by another method such as the inkjet method, in which inks of the respective colors of CMYK are ejected from nozzles as recording liquid drops and form a color image on a sheet, or the like. Moreover, the exemplary embodiment can be utilized as well in multicolor printing which is not limited to the four colors of CMYK.

The destination input interface 30 is an interface for acquiring an image file for forming a color image while reflecting color appearance. For example, the destination input interface 30 can be a functional section that receives an image file transmitted from the source output interface 24 of the image file creation section 12. Namely, the destination input interface 30 is provided with the functions of receiving, via the communication line 16, a signal based on a predetermined protocol, and converting the received signal into an image file and outputting the image file. As another example, when the image file is stored on a recording medium, the destination input interface 30 may be a functional section that is provided with a device for reading a flexible disk, and that executes processing of reading an image file out from a flexible disk.

As will be described in detail later (FIG. 3), the destination color converter 32 is a functional section that executes color conversion processing that converts an acquired image file into an image file for image formation while reflecting the color appearance.

The destination device 34 is a functional section that forms, as a color image, the image file created at the destination color converter 32. For example, the main body of an image forming device corresponds to the destination device 34. Namely, the destination device 34 is a device that forms a color image based on the inputted image data. Examples of the destination device 34 include an image forming device such as a color copier for example (e.g., a device that forms or prints a color image on a sheet by using color materials of the respective colors of CMYK). Further, the destination device 34 may be structured as a functional section that executes the processing of outputting color image data to an image forming device.

(Source Color Converter)

Figure 2:
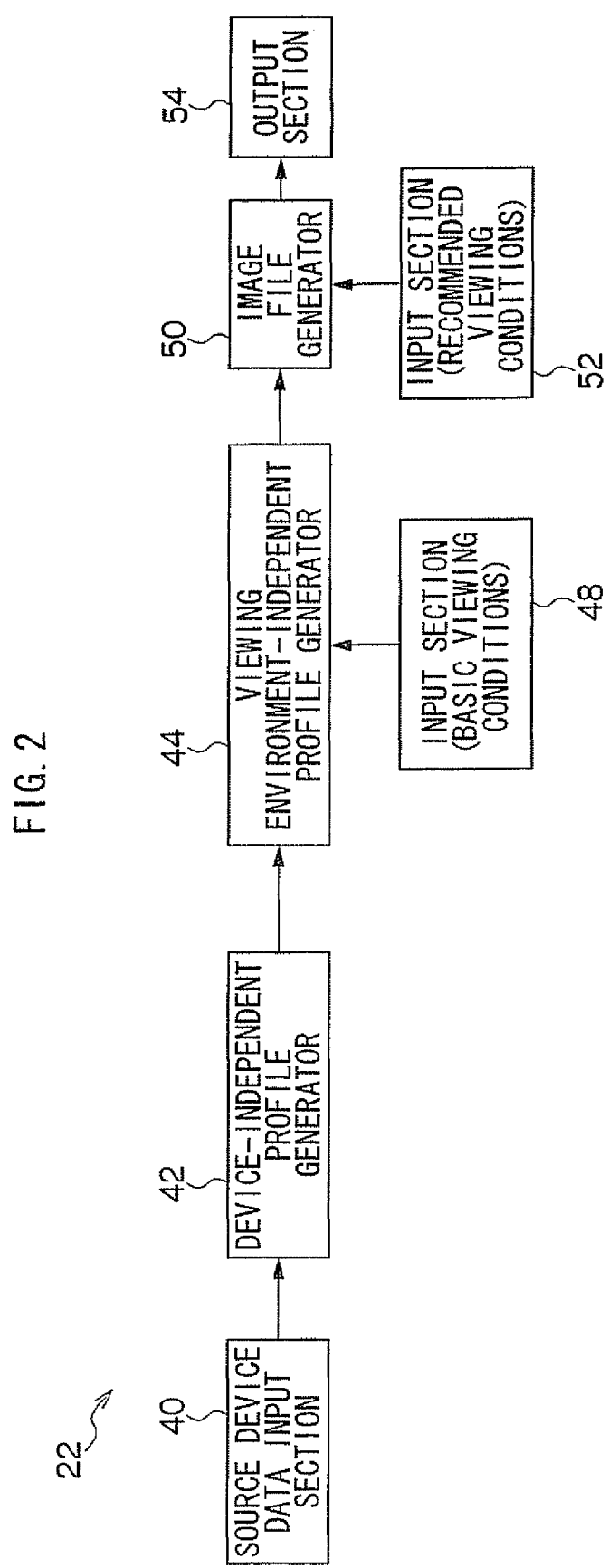
FIG. 2 is a block diagram showing the schematic structure of a source (creation end) color converter relating to the exemplary embodiment.

FIG. 2 shows the schematic structure of the source color converter 22. In the following explanation, the source color converter 22 is described as a functional section that gives, to image data, a profile for color conversion processing such that color conversion processing is possible in processing at a following stage. The source color converter 22 is provided with a source device data input section 40, a device-independent profile generator 42, a viewing environment-independent profile generator 44 to which an input section 48 is connected, an image file generator 50 to which an input section 52 is connected, and an output section 54. Note that, although a function block diagram of the source color converter 22 is shown in FIG. 2, the source color converter 22 can be realized by the CPU of an unillustrated computer executing a predetermined processing program that is stored.

The source device data input section 40 is a functional section that receives image data from the source device 20 and outputs it to the device-independent profile generator 42.

The device-independent profile generator 42 is a functional section that, when the color space of the image data inputted from the source device data input section 40 is different than the color space that is used in the following stages, generates and stores, as a profile, coefficients for out color space conversion into the color space that is used in the following stages. Namely, when the inputted image data is not image data of a device-independent color space, the device-independent profile generator 42 generates, as a profile, coefficients for converting the input image data into image data of a device-independent color space. Here, a color space such as, for example, CIE-L*a*b* is used as the color space that does not depend on a device. Color image data in the RGB color space for display on a CRT, color image data in the CMY color space, and color image data in the CMYK color space are examples of image data inputted from the source device data input section 40. Therefore, the device-independent profile generator 42 carries out conversion from a device-dependent color space to a device-independent color space, and generates the coefficients thereof as a device-independent profile.

The viewing environment-independent profile generator 44 is a functional section that generates a profile for obtaining the above-described color appearance model (see FIG. 4). The viewing environment-independent profile generator 44 generates and stores the coefficients of the formulas in the color appearance model as a profile (a viewing environment-independent profile). The input section 48 is connected to the viewing environment-independent profile generator 44. The input section 48 is a functional section for inputting basic viewing conditions that express the viewing environment at the time of creation of a color image (the first viewing environment 112 in FIG. 4). The viewing environment-independent profile is generated from the basic viewing conditions, and is stored as the source viewing conditions (see FIG. 5). Alternately, the inputted basic viewing conditions may be stored as is (without any processing thereto) as the source viewing conditions.

The image file generator 50 is a functional section that creates the image file 80 that can take color appearance into consideration. The input section 52 is connected to the image file generator 50. The input section 52 is a functional section for inputting, at the time of creation of a color image, target viewing conditions (hereinafter called recommended viewing conditions) expressing a viewing environment that is recommended for the created color image. In the same way as the viewing environment-independent profile generator 44, the image file generator 50 creates and stores, as a profile (a recommended viewing environment-dependent profile), coefficients of the formulas in the color appearance model that correspond to the recommended viewing conditions inputted at the input section 52. The recommended viewing environment dependent profile is generated from the recommended viewing conditions, and is stored as the destination viewing conditions (see FIG. 5). Alternately, the inputted recommended viewing conditions may be stored as is (without any processing thereto) as the destination viewing conditions.

The image file generator 50 stores, in the main data region 82, the image data acquired at the source device data input section 40, the device-independent profile generated at the device-independent profile generator 42, and the viewing environment-independent profile generated at the viewing environment-independent profile generator 44. Further, the image file generator 50 stores, in the sub-data region 90, the viewing conditions which are the recommended viewing environment-dependent profile which was generated and stored as the recommended viewing conditions. In this way, the image file 80 (see FIG. 5) is generated.

The output section 54 is a functional section that outputs, to the source output interface 24, the image file 80 generated at the image file generator 50.

(Destination Color Converter)

Figure 3:
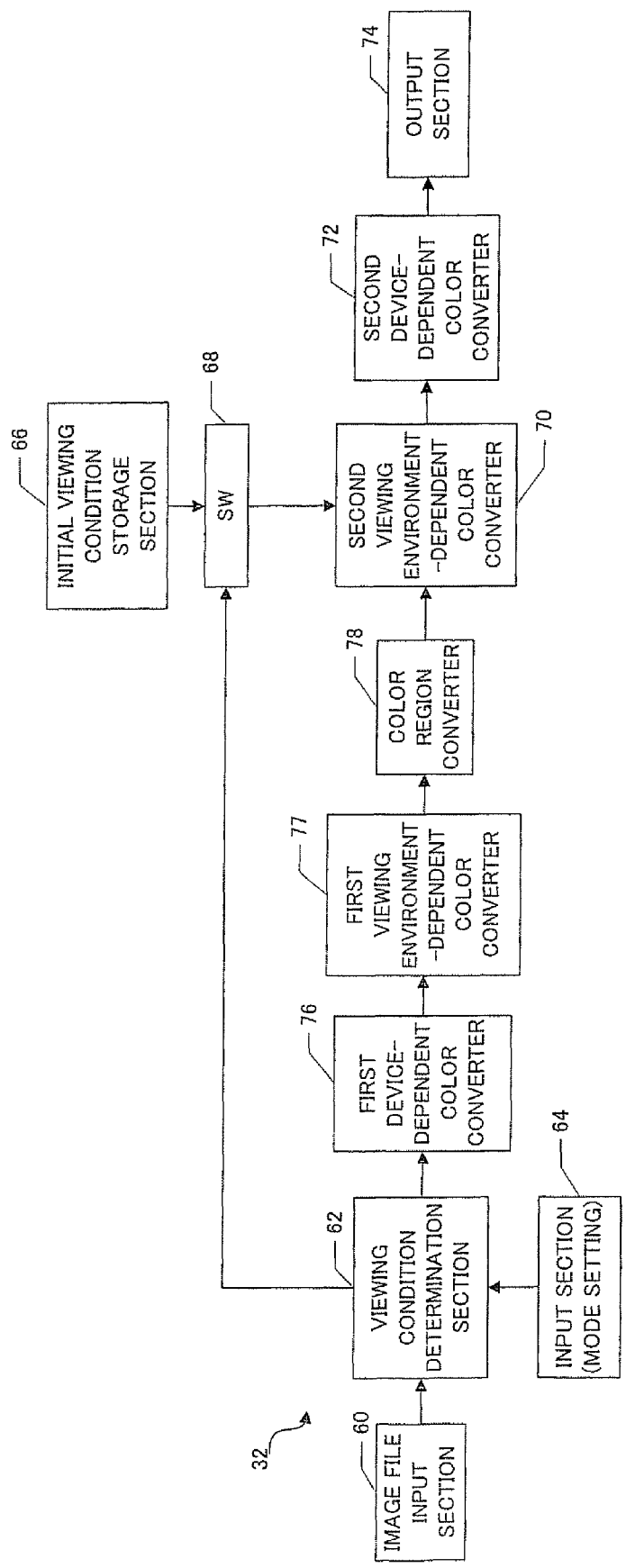
FIG. 3 is a block diagram showing the schematic structure of a destination (output end) color converter relating to the present exemplary embodiment.

FIG. 3 illustrates the schematic structure of the destination color converter 32. The destination color converter 32 is provided with an image file input section 60, a viewing condition determination section 62 to which an input section 64 is connected, a first device-dependent color converter 76, a first viewing environment-dependent color converter 77, a color region converter 78, a second viewing environment-dependent color converter 70, a second device-dependent color converter 72, and an outputting section 74. An initial viewing condition storage section 66 is connected via a switch 68 to the second viewing environment-dependent color converter 70. The viewing condition determination section 62 is also connected to the switch 68. The viewing conditions that are outputted to the second viewing environment-dependent color converter 70 can be switched at the switch 68 between conditions from the viewing condition determination section 62 and conditions from the initial viewing condition storage section 66. Note that, although a functional block diagram of the destination color converter 32 is shown in FIG. 3, the destination color converter 32 can be realized by the CPU of an unillustrated computer executing a predetermined processing program that is stored.

The image file input section 60 is a functional section that receives an image file from the destination input interface 30, and outputs it to the viewing condition determination section 62.

The viewing condition determination section 62 is a functional section that determines the mode that reflects the color appearance for the inputted image file. The input section 64 is connected to the viewing condition determination section 62, and input values for mode setting are inputted thereto. These modes include: a recommended mode that automatically uses recommended viewing conditions; a usual mode that uses viewing conditions determined in advance at the image forming section 14, without using the recommended viewing conditions; and a combined mode that uses the recommended viewing conditions when the recommended viewing conditions can be used, and uses the predetermined viewing conditions when the recommended viewing conditions cannot be used. As will be described in detail later, the viewing condition determination section 62 switches the switch 68 and outputs the viewing conditions in accordance with the mode which is set.

The first device-dependent color converter 76 converts image data of a device-dependent color space to image data of device-independent color space.

The first viewing environment-dependent color converter 77 further converts the image data of the device-independent color space to image data to which viewing conditions at the time of creation of the image file are reflected.

The color region converter 78 corrects and converts the above converted image data so that the color region of the image data falls within the color region of the destination (output) device.

The second viewing environment-dependent color converter 70 is a functional section that color-converts input color data to color data of a device-independent color space, on the basis of the viewing environment-independent profile for obtaining the above-described color appearance models 120, 122 (see FIG. 4). By using, as a reference, the image file based on the viewing conditions at the time of creation that are stored in the main data region 82, the second viewing environment-dependent color converter 70 reflects either the initial viewing conditions stored in the initial viewing condition storage section 66 or the recommended viewing conditions from the viewing condition determination section 62, and executes reverse conversion of the color appearance model.

The second device-dependent color converter 72 is a functional section that carries out color space conversion processing of the inputted image data of the device-independent color space into image data of a device-dependent color space. In the example of FIG. 4, image data of the YMCK color space of a color printer for example is the image data of the device-dependent color space. Therefore, the second device-dependent color converter 72 carries out color space conversion processing of color data of a device-independent color space (here, a color space such as CIE-L*a*b*) into image data of a device-dependent color space (here, the YMCK color space). The processes of this color space conversion are, for example, modeling in a forward direction from the CMYK color space which is a device color space into the CIELAB color space which is a device-independent color space, and determining color conversion coefficients for carrying out conversion from the CIE-L*a*b* color space which is a device-independent color space to the CMYK color space which is a device color space by the reverse model thereof. For example, a method such as disclosed in Makoto Sasaki and Hiroaki Ikegami, "Proc. Of International Congress of Imaging Science 2002", (2002), p. 413-414, which is incorporated in the disclosure of the present specification by reference, can be used as the model creation method.

The second device-dependent color converter 72 may output the device-independent color space as is, without any conversion. In this case, the processing of the second device-dependent color converter 72 is unnecessary, and the second device-dependent color converter 72 can be omitted from the structure.

(Operation of Color Management System)

Figure 6:
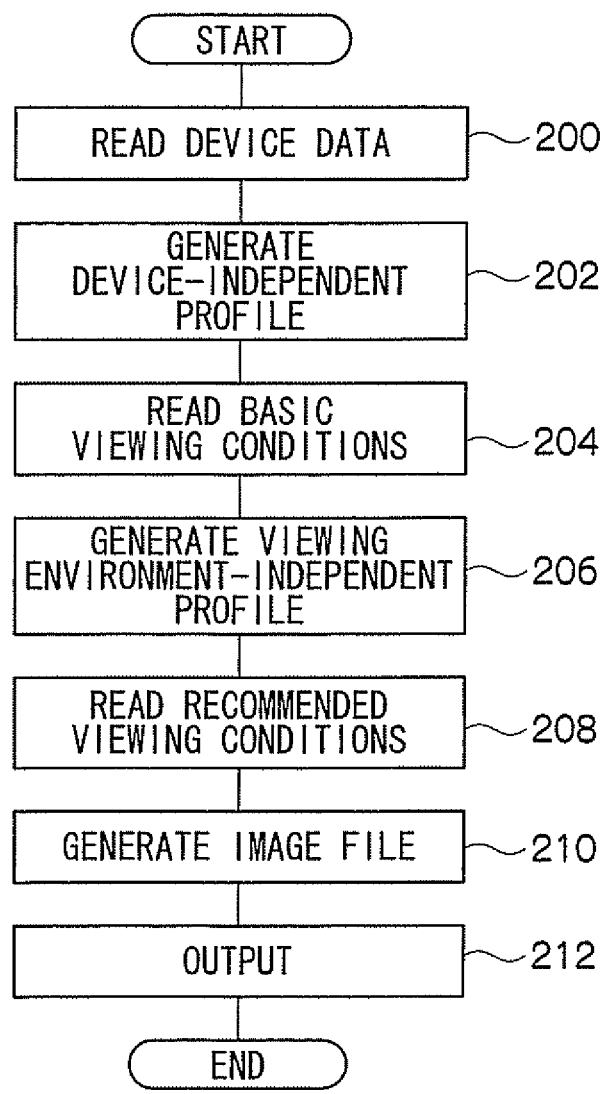
FIG. 6 is a flowchart showing the flow of processings of an image file creation section.
Figure 7:
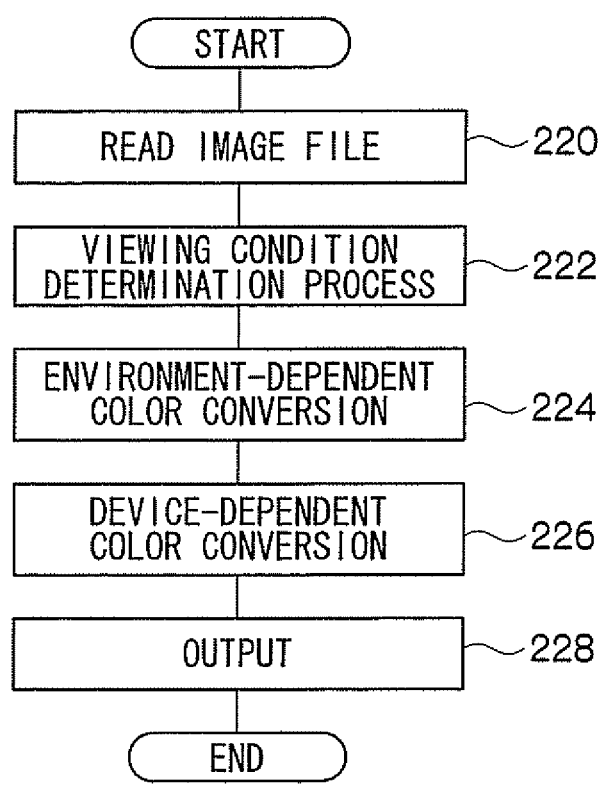
FIG. 7 is a flowchart showing the flow of processings of an image forming section.

Operation of the exemplary embodiment will be described next. FIG. 6 is a flowchart that shows the processes that are executed at the image file creation section 12. Further, FIG. 7 is a flowchart that shows the processes that are executed at the image forming section 14. Here, a case will be described in which the processings at the image file creation section 12 and the image forming section 14 in the above-described structures of the color management system 10, are implemented and executed by programs. Note that, by implementing the processings of the above-described respective structures by programs, a computer can be made to function as the above-described respective structures.

The image file creation processing routine shown in FIG. 6 is stored in advance in the memory at the image file creation section 12. This processing routine is executed in accordance with an instruction of a user from an input device such as a keyboard.

First, in step 200, the image data of the color image in the color space of the object device for creating the image file is read (acquired). In next step 202, a device-independent profile is generated and is stored temporarily. At this point in time, the image data of the color image can be converted into device-independent color data by using the device-independent profile. The process of step 200 corresponds to the function of inputting, at the source device data input section 40, the data acquired at the source device 20. The process of step 202 corresponds to the function of the device-independent profile generator 42.

In next step 204, the basic viewing conditions are read, and in subsequent step 206, a viewing environment-independent profile is generated and temporarily stored. At this point in time, the environmental conditions at the time of creation can be given to the image data of the color image. The process of step 204 corresponds to the function of reading input data from the input section 48 at the viewing environment-independent profile generator 44. Step 206 corresponds to the function of the viewing environment-independent profile generator 44.

In subsequent step 208, the recommended viewing conditions are read, and a recommended viewing environment-dependent profile is generated. In next step 210, an image file is generated. Namely, the image file is generated by appending, to the image data of the color image, the device-independent profile and the viewing environment-independent profile that are temporarily stored, and the recommended viewing environment-dependent profile. At this point in time, an image file is created in which the environmental conditions at the time of creation, and the viewing conditions that suppose the viewing environment recommended by the creator at the time of creation, are given to the image data of the color image. The process of step 208 corresponds to the function, at the image file generator 50, of reading the inputted data from the input section 52. Step 210 corresponds to the function of the image file generator 50.

After the image file is generated as described above, the image file is outputted in step 212. The process of step 212 corresponds to the function of outputting the image file, that was outputted from the output section 54, to the exterior by the source output interface 24.

Figure 8:
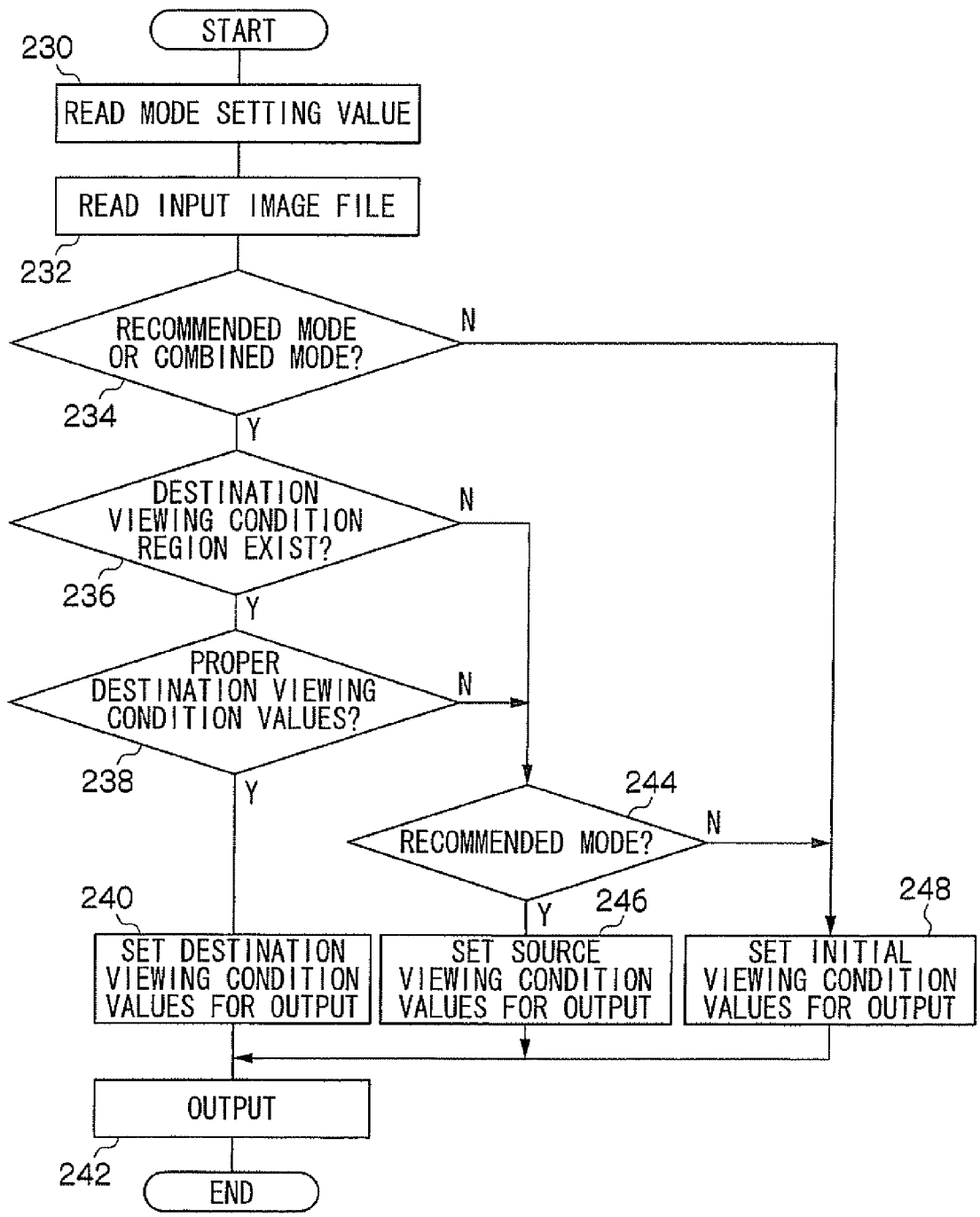
FIG. 8 is a flowchart showing details of step 222 of FIG. 7.

The image file creation processing routine shown in FIG. 7 and the determination processing routine shown in FIG. 8 are stored in advance in the memory in the image forming section 14. The processing routine shown in FIG. 7 is executed in accordance with the instruction of a user from an input device such as a keyboard or the like.

First, in step 220, the image file is read (acquired), and in next step 222, viewing condition determination processing is executed. The processing of step 220 corresponds to the function at the image file input section 60 of inputting the image file that was acquired from the exterior by the destination input interface 30. Further, the processing of step 222 corresponds to the function of the viewing condition determination section 62. Although details of the processing of step 222 will be described later, in this determination processing, the viewing conditions are decided upon in accordance with the set mode.

In next step 224, environment-dependent color conversion processing is executed that, in accordance with the decided-upon viewing conditions, converts the image file into color data that is dependent on the environment but is not dependent on a device. The processing of step 224 corresponds to the function of the second viewing environment-dependent color converter 70. In subsequent step 226, device-dependent color conversion processing that converts the color data, which was converted in step 224, into device-dependent image data is executed. The processing of step 226 corresponds to the function of the second device-dependent color converter 72.

After the device-dependent image data is generated as described above, the image data is outputted in step 228. The processing of step 228 corresponds to the function of forming a color image by the destination device 34 on the basis of the image data outputted from the output section 74.

The details of step 222 will be described next with reference to FIG. 8. The determination processing routine of FIG. 8 is executed in step 222 of FIG. 7.

First, in step 230, the mode setting value that is the standard for determination is read-out. The processing of step 230 corresponds to the function of the viewing condition determination section 62 reading the mode setting value that was inputted at the input section 64. The modes are: the recommended mode that automatically uses the recommended viewing conditions; the usual mode that uses viewing conditions determined in advance at the image forming section 14 end, without using the recommended viewing conditions; and the combined mode that uses the recommended viewing conditions when the recommended viewing conditions can be used, and uses the predetermined viewing conditions when the recommended viewing conditions cannot be used.

In next step 232, the inputted image file is read-out. The processing of step 232 corresponds to the function at the viewing condition determination section 62 of reading the image file from the image file input section 60.

In subsequent step 234, it is determined whether or not the set value that was read in step 230 expresses either of the recommended mode or the combined mode. If the determination is affirmative, the routine moves on to step 236, whereas if the determination is negative, the routine proceeds to step 248. In step 236, it is determined whether or not a destination viewing condition region, which is the sub-data region 90, exists in the image file that was read-out in step 232. If the determination is affirmative, the routine proceeds to step 238 and it is determined whether or not the condition values stored in the sub-data region 90 (the values of the recommended viewing conditions) are proper. The determination in step 238 can be a determination that the data is not 0 or empty (e.g., NULL), or a determination that the data meet with a criteria for the values of the viewing conditions, or the like. The criteria of the recommended (target) viewing conditions also can be stored in advance in the destination color converter 32.

If the determination in step 238 is affirmative, in step 240, the switch 68 is switched from the initial viewing condition storage section 66 to the viewing condition determination section 62, in order to cause the second viewing environment-dependent color converter 70 to use the values of the recommended viewing conditions that are stored in the sub-data region 90. In this way, in a processing of a following stage, color conversion processing can be executed by using the recommended viewing conditions that are included in the image file inputted at the image file input section 60. Then, in step 242, as an image file, the data stored in the main data region 82 is outputted and the values of the recommended viewing conditions stored in the sub-data section 90 are outputted.

On the other hand, if the determination in step 236 is negative or the determination in step 238 is negative, there is a case in which the recommended viewing conditions themselves do not exist or a case in which the recommended viewing conditions cannot be utilized. Thus, the routine moves on to step 244, and it is determined whether or not the set value read-out in step 230 expresses the recommended mode. In the case of the recommended mode, it means it is recommended that the intentions at the time of creation be reflected at the time of color image formation thereafter. Therefore, the determination in step 244 is affirmative, and the routine moves on to step 246 where setting is carried out in order to output the values of the viewing conditions at the time of creation instead of the recommended viewing conditions. In this processing, the switch 68 switches from the initial viewing condition storage section 66 to the viewing condition determination section 62, and changes the outputted contents in order to cause the second viewing environment-dependent color converter 70 to use the values of the viewing conditions at the time of creation as the values of the recommended viewing conditions. In this way, in processing of a following stage, color conversion processing can be executed by using the viewing conditions at the time of creation that are included in the image file inputted at the image file input section 60.

If the determination in step 234 is negative or the determination in step 244 is negative. It means an instruction to execute processing in the usual mode. Thus, the routine moves on to step 248, and setting is carried out in order to output the values of the initial viewing conditions. In this processing, the switch 68 is switched to the initial viewing condition storage section 66, and outputting of the values of the recommended viewing conditions is prohibited. In this way, in a processing of a following stage, color conversion processing can be executed by using the viewing conditions at the time of creation that are included in the image file inputted at the image file input section 60, and the initial viewing conditions that are determined in advance at the image forming section 14 end.

In this way, in the exemplary embodiment, when creating an image file that includes image data of a color image and takes color appearance into consideration, the viewing environment that affects the color appearance of a color image to be formed by using this image file can be designated in advance. The intentions at the time of creation can thereby be reflected, even if there is an image file that contains color appearance as viewing conditions. Accordingly, the demand to maintain the colorimetric color appearance of the time of creation can be realized.

Note that the above exemplary embodiment describes an aspect that applies the present invention to a case of carrying out color space conversion that converts L*a*b* values to CMYK values based on the assumption that image formation is to be carried out by using color materials of the respective colors of CMYK. However, the exemplary embodiment is not limited to the above, and can also be applied to, for example, cases of carrying out color conversion that converts CMYK values to color values of an even larger number of types based on the assumption that image formation is to be carried out by using color materials of a larger number of colors. Aspects such as described above also are included within the scope of the present invention. Further, in the above description, the L*a*b* color space is described as an example of a color space that is not dependent on a device. However, the exemplary embodiment is not limited to the same, and can apply a color appearance model such as the CIECAM02 space (regarding CIECAM02, see CIE Technical Report 159-2004 "A COLOUR APPEARANCE MODEL FOR COLOUR MANAGEMENT SYSTEM: CIECAM02", which is incorporated in the disclosure of the present specification by reference), CIEXYZ tristimulus values, and color spaces such as iCAM or the like.

What is claimed is:

1. An image file creation device comprising:
an obtaining section that obtains image data forming a color image, conversion conditions for converting the image data into color data of a device-independent color space, and basic viewing conditions that express a viewing environment at the time of creation of the image data;
an input section that inputs target viewing conditions for viewing a formed image that is to be formed from the image data; and
a creation section that creates an image file containing a main data region for storing the image data, the conversion conditions and the basic viewing conditions, and a sub-data region for storing the target viewing conditions,
wherein the target viewing conditions are based at least on user inputted data or on sensor data, and express a viewing environment that is recommended for the formed color image, and
wherein the created image file is adapted to be processed by an image processing device to form the color image from the image data using the target viewing conditions that are stored in the sub-data region.

2. An image processing device comprising:
a reader that reads an image file having a main data region for storing image data forming a color image, conversion conditions for converting the image data into color data of a device-independent color space, and basic viewing conditions that express a viewing environment at the time of creation of the image data;
a storage section that stores initial viewing conditions for viewing a color image that is to be formed from the image data;
an extraction section that searches for a sub-data region in the read image file to extract target viewing conditions from the read image file;
a selector that selects the initial viewing conditions, the basic viewing conditions or the target viewing conditions as viewing conditions for color conversion that reflect color appearance;
a color converter that converts the image data of the read image file into color data of a device-independent color space, on the basis of the selected viewing conditions, the conversion conditions and the basic viewing conditions of the image file; and
a destination device that forms a color image from the converted color data,
wherein the target viewing conditions are based at least on user inputted data or on sensor data, and express a viewing environment that is recommended for the formed color image.

3. The image processing device of claim 2, wherein if the sub-data region is detected, the extraction section extracts the target viewing conditions that are stored in the sub-data region.

4. The image processing device of claim 3, wherein the storage section stores predetermined criteria of the target viewing conditions, and
the extraction section reads out the target viewing conditions stored in the sub-data region, and if the target viewing conditions do not meet with the predetermined criteria of the target viewing conditions, the selector selects, as the selected viewing conditions, the basic viewing condition that are stored in the main data region.

5. The image processing device of claim 2, wherein if the sub-data region is not detected, the selector selects, as the selected viewing conditions, the basic viewing conditions that are stored in the main data region.

6. The image processing device of claim 2, wherein if the sub-data section is not detected, the selector selects the initial viewing conditions as the selected viewing conditions.

7. The image processing device of claim 2, wherein the selector selects the selected viewing conditions based on an input mode input by a user.

8. The image processing device of claim 7, wherein the input mode includes one of:
a recommended mode that automatically uses the target viewing conditions,
a usual mode that uses the initial viewing conditions, or
a combined mode that uses the target viewing conditions if the target viewing conditions can be used, and uses the basic viewing conditions if the target conditions cannot he used.

9. An image processing system comprising:
an image file creation device, the image file creation device, including:
an obtaining section that obtains image data forming a color image, conversion conditions for converting the image data into color data of a device-independent color space, and basic viewing conditions that express a viewing environment at the time of creation of the image data;
an input section that inputs target viewing conditions for viewing a color image that is to be formed from the image data; and
a creation section that creates an image file containing a main data region for storing the image data, the conversion conditions and the basic viewing conditions, and a sub-data region for storing the target viewing conditions;
the image processing device of claim 2; and
a transmission section that performs transmission and receipt of the image file between the devices.

10. An image file creation method comprising:
obtaining image data forming a color image, conversion conditions for converting the image data into color data of a device-independent color space, and basic viewing conditions that express a viewing environment at the time of creation of the image data;
receiving target viewing conditions for viewing a color image that is to be formed from the image data; and
creating an image file containing a main data region for storing the image data, the conversion conditions and the basic viewing conditions, and a sub-data region for storing the target viewing conditions,
wherein the target viewing conditions are based at least on user inputted data or on sensor data, and express a viewing environment that is recommended for the formed color image, and
wherein the created image file is adapted to be processed by an image processing device to form the color image from the image data using the target viewing conditions that are stored in the sub-data region.

11. An image processing method comprising:
storing initial viewing conditions for viewing a color image that is to be formed from image data in an image file;
reading an image file having a main data region for storing image data, conversion conditions for converting the image data into color data of a device-independent color space, and basic viewing conditions that express a viewing environment at the time of creation of the image data;
searching for a sub-data region in the read image file to extract target viewing conditions from the read image file;
selecting the initial viewing conditions, the basic viewing conditions or the target viewing conditions as viewing conditions for color conversion that reflect color appearance;
converting the image data of the read image file into color data of a device-independent color space, on the basis of the selected viewing conditions, the conversion conditions and the basic viewing conditions of the image file; and
forming a color image from the converted color data,
wherein the target viewing conditions are based at least on user inputted data or on sensor data, and express a viewing environment that is recommended for the formed image.

12. The image processing method of claim 11, wherein the extracting includes, if the sub-data region is detected, extracting the target viewing conditions that are stored in the sub-data region.

13. The image processing method of claim 12, further comprising storing predetermined criteria of the target viewing conditions,
wherein the extracting includes reading out the target viewing conditions stored in the sub-data region, and, if the target viewing conditions do not meet with the predetermined criteria of the target viewing conditions, the selecting includes selecting, as the selected viewing conditions, the basic viewing conditions that are stored in the main data region.

14. The image processing method of claim 11, wherein the selecting includes, if the sub-data region is not detected, selecting, as the selected viewing conditions, the basic viewing conditions that are stored in the main data region.

15. The image processing method of claim 11, wherein the selecting includes, if the sub-data section is not detected, selecting the initial viewing conditions as the selected viewing conditions.

16. A non-transitory computer-readable storage medium storing a program for causing a computer to execute image file creation processing, the image file creation processing comprising:
obtaining image data forming a color image, conversion conditions for converting the image data into color data of a device-independent color space, and basic viewing conditions that express a viewing environment at the time of creation of the image data;
receiving target viewing conditions for viewing a color image that is to be formed from the image data; and
creating an image file containing a main data region for storing the image data, the conversion conditions and the basic viewing conditions, and a sub-data region for storing the target viewing conditions,
wherein the target viewing conditions are based at least on user inputted data or on sensor data, and express a viewing environment that is recommended for the formed image, and
wherein the created image file is adapted to be processed by an image processing device to form the color image from the image data using the target viewing conditions that are stored in the sub-data region.

17. A non-transitory computer-readable storage medium storing a program for causing a computer to execute image processing, the image processing comprising:
storing initial viewing conditions for viewing a color image that is to be formed from image data in an image file;
reading an image file having a main data region for storing image data, conversion conditions for converting the image data into color data of a device-independent color space, and basic viewing conditions that express a viewing environment at the time of creation of the image data;
searching for a sub-data region in the read image file to extract target viewing conditions from the read image file;
selecting the initial viewing conditions, the basic viewing conditions or the target viewing conditions as viewing conditions for color conversion that reflect color appearance;
converting the image data of the read image file into color data of a device-independent color space, on the basis of the selected viewing conditions, the conversion conditions and the basic viewing conditions of the image file; and
forming a color image from the converted color data,
wherein the target viewing conditions are based at least on user inputted data or on sensor data, and express a viewing environment that is recommended for the formed color image.

* * * * *